US012802198B2

(12) United States Patent
Iwano

(10) Patent No.: US 12,802,198 B2
(45) Date of Patent: Nov. 17, 2026

(54) IMAGE DIAGNOSIS SYSTEM AND IMAGE DIAGNOSIS METHOD

(71) Applicant: CANON KABUSHIKI KAISHA, Tokyo (JP)

(72) Inventor: Shunsuke Iwano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 18/735,912

(22) Filed: Jun. 6, 2024

(65) Prior Publication Data

US 2024/0428392 A1 Dec. 26, 2024

(30) Foreign Application Priority Data

Jun. 21, 2023 (JP) ................................ 2023-101672

(51) Int. Cl.
*G06T 7/00* (2017.01)

(52) U.S. Cl.
CPC .. *G06T 7/0004* (2013.01); *G06T 2207/30144* (2013.01); *G06T 2207/30168* (2013.01); *G06T 2207/30176* (2013.01)

(58) Field of Classification Search
CPC ......... G06T 7/0004; G06T 2207/30144; G06T 2207/30168; G06T 2207/30176
See application file for complete search history.

(56) References Cited

U.S. PATENT DOCUMENTS

| | | | | |
|---|---|---|---|---|
| 10,819,862 | B2 | 10/2020 | Kodama | |
| 2015/0331640 | A1 | 11/2015 | Matsuzaki | |
| 2021/0141577 | A1* | 5/2021 | Ito | G06F 3/1256 |
| 2022/0126601 | A1* | 4/2022 | Mutsuno | G03G 15/5062 |

FOREIGN PATENT DOCUMENTS

| | | | |
|---|---|---|---|
| JP | 2003054078 | A | 2/2003 |
| JP | 2014236343 | A | 12/2014 |
| JP | 2019133020 | A | 8/2019 |
| JP | 2022025312 | A | 2/2022 |
| JP | 2023053567 | A | 4/2023 |

* cited by examiner

*Primary Examiner* — John R Wallace
(74) *Attorney, Agent, or Firm* — Canon U.S.A., Inc. IP Division

(57) ABSTRACT

An image diagnosis system includes an operation unit configured to display information, an image forming unit including a plurality of portions and configured to form an image on a sheet, a reading unit configured to read the image formed by the image forming unit, a display control unit configured to cause the operation unit to display a screen for receiving an instruction to start an image diagnosis, and a diagnosis unit configured to, if the operation unit receives the instruction to start the image diagnosis, cause the image forming unit to form a diagnosis image on the sheet, to cause the reading unit to read the diagnosis image formed and output by the image forming unit, and to diagnose a malfunction portion of the image forming unit based on the read image, wherein the screen includes a display of a number of output sheets with the diagnosis image thereon.

14 Claims, 14 Drawing Sheets

FIG.8

| DIAGNOSIS CONDITIONS | | | MODEL A | MODEL B |
|---|---|---|---|---|
| DIAGNOSIS ITEM | DIAGNOSIS COLOR | SHEET SIZE | | |
| VERTICAL STEAK | C, M, Y | A4 | 1 SHEET ~803 | 1 SHEET |
| | | A3 | 1 SHEET | 1 SHEET |
| | | 19 INCHES | 1 SHEET | 1 SHEET |
| | K | A4 | 1 SHEET | 1 SHEET |
| | | A3 | 1 SHEET | 1 SHEET |
| | | 19 INCHES | 1 SHEET | 1 SHEET |
| HORIZONTAL STREAK | C, M, Y | A4 | 15 SHEETS ~801 | 30 SHEETS |
| | | A3 | 10 SHEETS | 20 SHEETS |
| | | 19 INCHES | 8 SHEETS | 15 SHEETS |
| | K | A4 | 15 SHEETS ~802 | 30 SHEETS |
| | | A3 | 10 SHEETS | 20 SHEETS |
| | | 19 INCHES | 8 SHEETS | 15 SHEETS |
| DOT | C, M, Y | A4 | 15 SHEETS ~804 | 30 SHEETS |
| | | A3 | 10 SHEETS | 20 SHEETS |
| | | 19 INCHES | 8 SHEETS | 15 SHEETS |
| | K | A4 | 15 SHEETS | 30 SHEETS |
| | | A3 | 10 SHEETS | 20 SHEETS |
| | | 19 INCHES | 8 SHEETS | 15 SHEETS |

FIG.9

| DIAGNOSIS CONDITIONS | | MODEL A | | MODEL B | |
|---|---|---|---|---|---|
| AUTO-RECOVERY ITEM | SHEET SIZE | ADJUSTMENT | CONFIRMATION | ADJUSTMENT | CONFIRMATION |
| CORONA CHARGER CLEANING | A4 | 0 SHEETS | 1 SHEET | 0 SHEETS | 1 SHEET |
| | A3 | 0 SHEETS | 1 SHEET | 0 SHEETS | 1 SHEET |
| | 19 INCHES | 0 SHEETS | 1 SHEET | 0 SHEETS | 1 SHEET |
| SECONDARY TRANSFER CURRENT ADJUSTMENT | A4 | 2 SHEETS ~901 | 1 SHEET ~902 | 2 SHEETS | 1 SHEET |
| | A3 | 1 SHEET | 1 SHEET | 1 SHEET | 1 SHEET |
| | 19 INCHES | 1 SHEET | 1 SHEET | 1 SHEET | 1 SHEET |
| DRUM IDLE ROTATION | A4 | 0 SHEETS ~903 | 2 SHEETS ~904 | 0 SHEETS | 4 SHEETS |
| | A3 | 0 SHEETS | 1 SHEET | 0 SHEETS | 3 SHEETS |
| | 19 INCHES | 0 SHEETS | 1 SHEET | 0 SHEETS | 2 SHEETS |

IMAGE DIAGNOSIS SYSTEM AND IMAGE DIAGNOSIS METHOD

BACKGROUND OF THE INVENTION

Field of the Invention

The present invention relates to an image diagnosis system and an image diagnosis method.

Description of the Related Art

There is known an image diagnosis technique for an image forming apparatus including a printing unit and an image reading unit, in which the image reading unit reads a chart for diagnosis (diagnosis chart) printed by the printing unit, to diagnose a malfunction portion in the image forming apparatus from image data obtained by reading the diagnosis chart. Japanese Patent Application Laid-Open Publication No. 2019-133020 discusses a technique of reading images on recording media on which patterns each including a horizontal band chart and a vertical band chart are printed, and identifying an item for which an image diagnosis is required, based on the read image.

SUMMARY OF THE INVENTION

However, the technique discussed in Japanese Patent Application Laid-Open Publication No. 2019-133020 does not include means to notify a user of the number of diagnosis charts to be printed before printing the diagnosis charts. Accordingly, since the user does not know the number of diagnosis charts to be printed before printing the diagnosis charts, the image diagnosis may be interrupted in the middle of printing the diagnosis charts due to run out of sheets.

According to an aspect of the present invention, an image diagnosis system includes an operation unit configured to display information, an image forming unit including a plurality of portions and configured to form an image on a sheet, a reading unit configured to read the image formed by the image forming unit, a display control unit configured to cause the operation unit to display a screen for receiving an instruction to start an image diagnosis, and a diagnosis unit configured to, if the operation unit receives the instruction to start the image diagnosis, cause the image forming unit to form a diagnosis image on the sheet, to cause the reading unit to read the diagnosis image formed and output by the image forming unit, and to diagnose a malfunction portion of the image forming unit based on the read image, wherein the screen includes a display of a number of output sheets with the diagnosis image thereon.

Further features of the present invention will become apparent from the following description of embodiments with reference to the attached drawings.

BRIEF DESCRIPTION OF THE DRAWINGS

FIG. 8 is a diagram schematically illustrating a table used for calculating the number of test charts to be used for the image diagnosis processing.

FIG. 9 is a diagram schematically illustrating a table used for calculating the number of test charts to be used for the auto-recovery processing.

DESCRIPTION OF THE EMBODIMENTS

Hereinbelow, embodiments of the present invention will be described in detail with reference to the attached drawings. In addition, the same reference numbers are assigned to the same components, and the descriptions thereof are omitted.

<Entire System Configuration>

Figure 1:
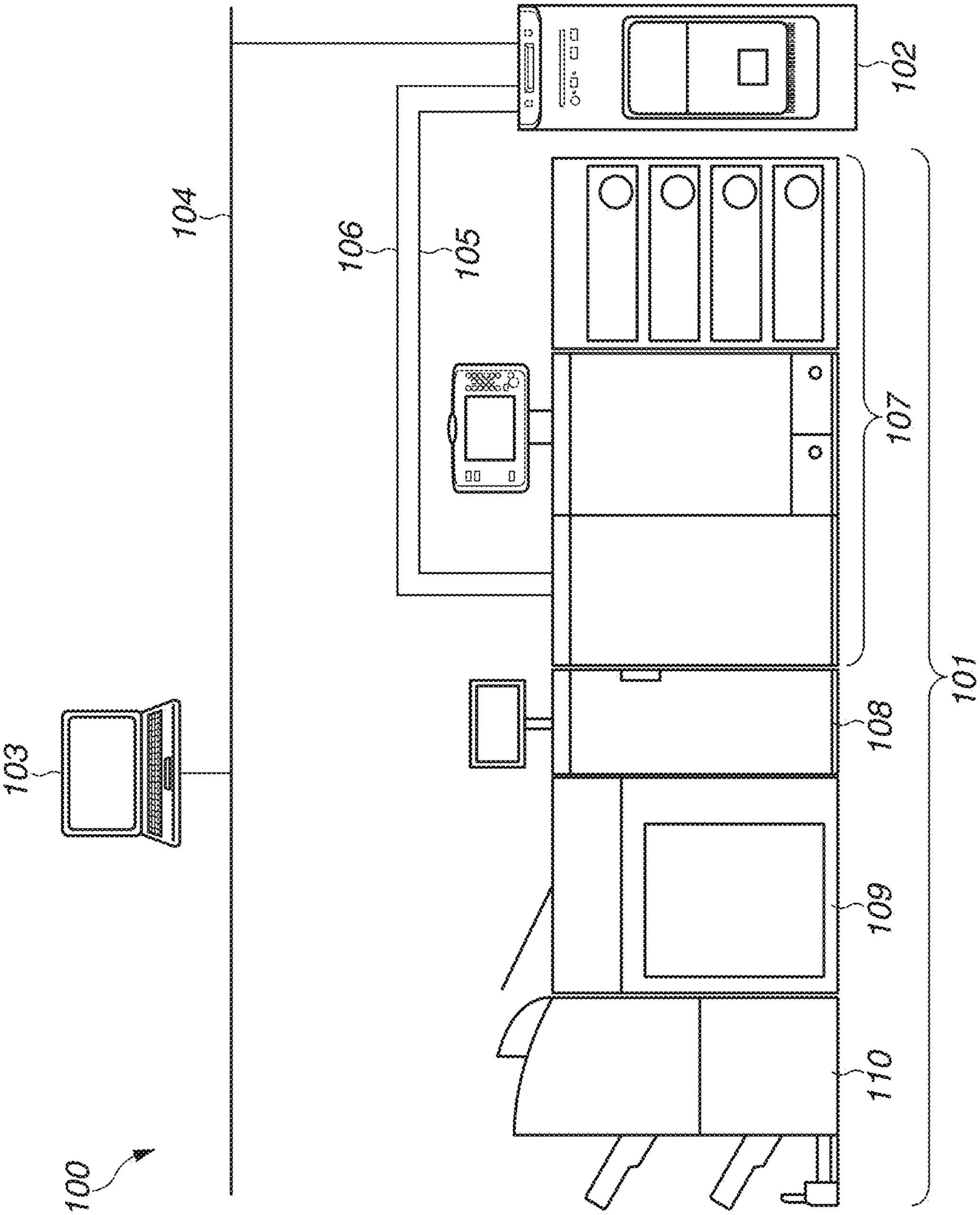
FIG. 1 is a diagram illustrating an example of a network configuration including a printing system according to a first embodiment.

FIG. 1 is a diagram illustrating an example of a network configuration including a printing system (image diagnosis system) according to a first embodiment. As illustrated in FIG. 1, a printing system 100 includes an image forming apparatus 101 and an external controller 102. The image forming apparatus 101 and the external controller 102 are communicably connected via an internal local area network (LAN) 105 and a video cable 106. The external controller 102 is communicably connected with a client personal computer (PC) 103 via an external LAN 104.

The client PC 103 can issue a print instruction to the external controller 102 via the external LAN 104. A printer driver having a function of converting image data serving as a print processing target into a Page Description Language (PDL) processable by the external controller 102 is installed in the client PC 103. A user who wants to perform printing can issue a print instruction from various applications installed in the client PC 103 via the printer driver by operating the client PC 103. The printer driver transmits the PDL data serving as print data to the external controller 102, based on the print instruction from the user. Upon receiving the PDL data from the client PC 103, the external controller 102 analyzes and interprets the received PDL data. The external controller 102 performs rasterizing processing based on a result of interpretation, generates a bitmap image (print image data) with a resolution suitable for the image forming apparatus 101, and issues a print instruction to the image forming apparatus 101 by inputting a print job.

Next, the image forming apparatus 101 will be described. The image forming apparatus 101 is configured in which a plurality of devices (units) having different functions is connected with each other, to be able to perform complicated print processing, such as bookbinding.

The image forming apparatus 101 includes a printing unit 107 (image forming unit), a diagnosis unit 108, a stacker 109, and a finisher 110. Hereinbelow, each module will be described.

The printing unit 107 prints an image based on a print job, and discharges a printed recording material. The printed recording material discharged from the printing unit 107 is conveyed through the diagnosis unit 108, the stacker 109, and the finisher 110 in this order. In the present embodiment, the image forming apparatus 101 of the printing system 100 is an example of an image forming apparatus, and the printing unit 107 included in the image forming apparatus 101 may be referred to as an image forming apparatus in some cases. The printing unit 107 forms (prints) an image using toners (color materials) on a recording material fed and conveyed from a sheet feeding unit disposed at a lower portion of the printing unit 107.

The diagnosis unit 108 is a device that executes diagnosis to determine whether a malfunction portion of the image forming apparatus 101 exists, based on the printed recording material with an image printed thereon by the printing unit 107 and conveyed through a conveyance path. More specifically, the diagnosis unit 108 reads the image printed on the conveyed printed recording material, and performs a diagnosis based on the read image. The malfunction diagnosis is determined by extracting a diagnosis area from the read image, and checking a difference between read signal values in the extracted diagnosis area. Details of the processing by the diagnosis unit 108 will be described below. However, the use of the diagnosis unit 108 is not limited to the above-described example. The diagnosis unit 108 may also have a checking function to check whether a print defect of the printed recording material exists.

The stacker 109 is a device capable of stacking a large number of printed recording materials. The finisher 110 is a device capable of performing finishing processing, such as stapling processing, punching processing, and saddle-stitching processing, on the conveyed print-completed recording materials.

The recording material subjected to the processing by the finisher 110 is discharged to a predetermined discharge tray.

In the configuration example in FIG. 1, the external controller 102 is connected to the image forming apparatus 101, but the present embodiment can be also applied to different configurations. For example, a configuration in which the image forming apparatus 101 is connected to the external LAN 104, and the print data is transmitted from the client PC 103 to the image forming apparatus 101 without the external controller 102 may be employed. In this case, the data analysis and the rasterizing processing on the print data are performed by the image forming apparatus 101.

<Hardware Configuration of Image Forming Apparatus>

Figure 2:
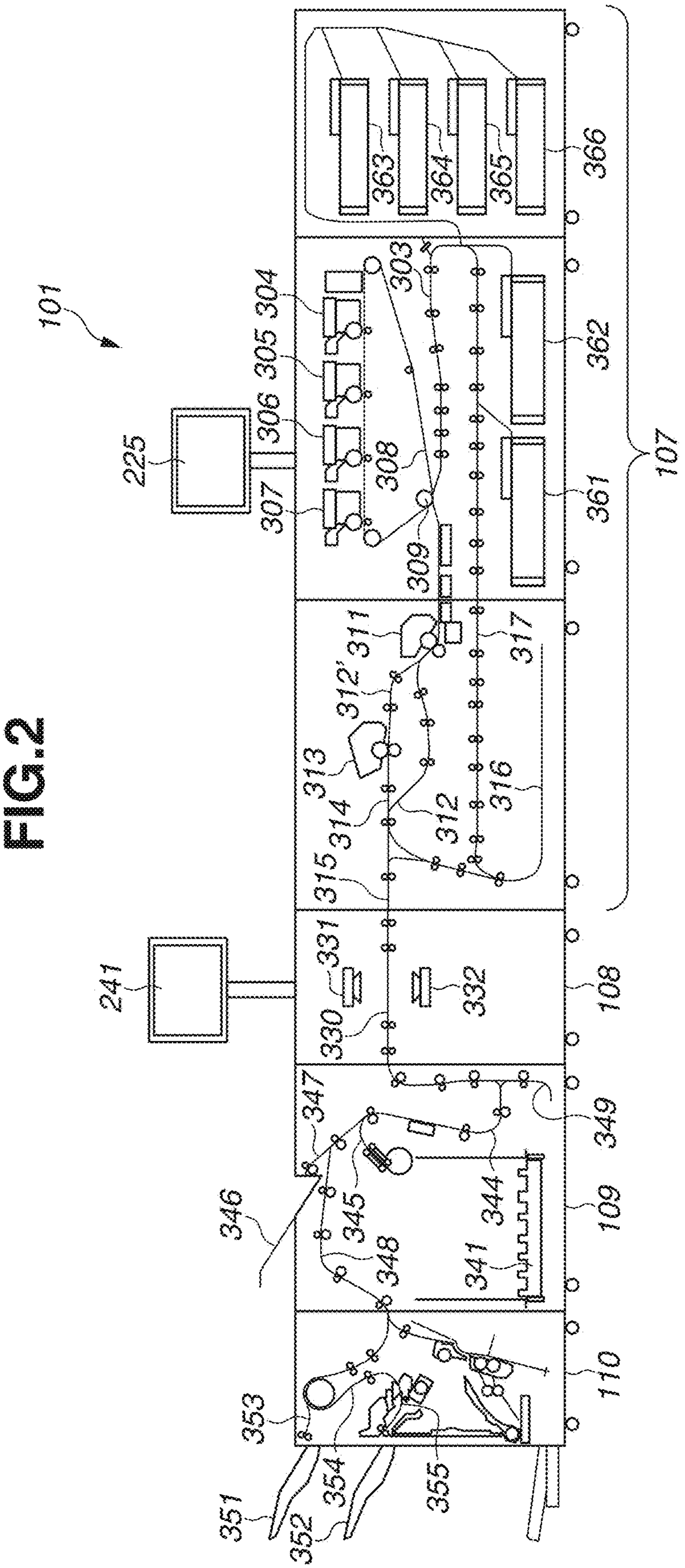
FIG. 2 is a cross-section diagram illustrating an example of a hardware configuration of an image forming apparatus.

FIG. 2 is a cross-section diagram illustrating an example of a hardware configuration of the image forming apparatus 101. With reference to FIG. 2, a specific operation example of the image forming apparatus 101 will be described.

<Sheet Feeding Deck>

The printing unit 107 is provided with a plurality of sheet feeding decks. In the present embodiment, the printing unit 107 is provided with six decks, i.e., sheet feeding decks 361, 362, 363, 364, 365, and 366. In the sheet feeding decks 361, 362, 363, 364, 365, and 366, various types of recording materials (sheets) are stored. In each of the sheet feeding decks 361, 362, 363, 364, 365, and 366, an uppermost recording material of the recording materials stored in the sheet feeding deck is separated one by one and fed to a conveyance path 303. Further, the printing unit 107 obtains sheet information of the stored sheets, based on a sensor provided on each of the sheet feeding decks 361, 362, 363, 364, 365, and 366, and an instruction from a user. The sheet information in the present embodiment includes a sheet size, a basis weight, a surface property, and a sheet color. The printing unit 107 obtains these pieces of sheet information and holds them in a hard disk drive (HDD) (described below). The sheet size is finished dimensions of a sheet defined by International Organization for Standardization (ISO) 216. In the present embodiment, the printing unit 107 can determine photo paper size series in addition to A size series and B size series. The basis weight is information expressed by a weight of a paper board serving as a reference of a sheet, and is a mass of a sheet per 1 $m^2$. In the present embodiment, the basis weight is classified into four stages of 79 $g/m^2$ or less (thin paper), 80 $g/m^2$ or more and 127 $g/m^2$ or less (plain paper), 128 $g/m^2$ or more and 200 $g/m^2$ or less (thick paper), and 201 $g/m^2$ or more (thick paper 2). The surface property is information that represents a sheet type difference due to an unevenness of a sheet surface. In the present embodiment, there are seven types of sheets, i.e., fine quality paper, single-side coated paper, double-side coated paper, matt coated paper, embossed paper, film paper, and recycled paper.

Last of all, the paper color is information expressing a degree of whiteness of paper defined, for example, by ISO 12470, and in the present embodiment, paper with a degree of whiteness of 70% or more is determined to be white paper, and paper with a degree of whiteness of less than 70% is determined to be colored paper. A schematic example of the sheet information held in the printing unit 107 is illustrated in a table 1 below.

The printing unit 107 reads the position of a guide (not illustrated) in each of the sheet feeding decks 361, 362, 363, 364, 365, and 366 using a sensor to automatically acquire the sheet size. Other information is acquired via a sheet information change screen (described below) on which a user selects and inputs information. In the present embodiment, the description is given of the example in which only a part of the sheet information is acquired using the sensor provided in each of the sheet feeding decks 361, 362, 363, 364, 365, and 366, but it is not limited to the above-described example. For example, the printing unit 107 may be configured to cause a sheet stored in the sheet feeding deck to pass and determine the sheet information based on the image read by a reading device (described below).

TABLE 1

| Deck ID | Sheet Size | Basis Weight | Surface Property | Paper Color |
|---|---|---|---|---|
| 1 | A3 | 80-90 $g/m^2$ | Fine quality paper | White |
| 2 | A4 | 80-90 $g/m^2$ | Fine quality paper | Colored |
| 3 | A4 | 129-150 $g/m^2$ | Embossed paper | White |
| 4 | A3 | 52-63 $g/m^2$ | Fine quality paper | White |
| 5 | A3 | 129-150 $g/m^2$ | Single-side coated paper | White |
| 6 | 13 × 19 | 80-90 $g/m^2$ | Fine quality paper | White |

The table 1 holds a deck identification (ID) and sheet information for each of the six sheet feeding decks 361 to 366. In addition, the determination levels to determine the sheet information are not limited to the above-described example. The determination levels may only need to have sufficient resolutions that allows determination of whether the conformance conditions of the test chart for the image diagnosis are satisfied or higher resolutions, which will be described below, and the sheet information may be determined with finer classification levels. As a more desirable example, the example of providing the sensor in each of the sheet feeding decks 361 to 366 to automatically acquire the information is described above, but a user may register the sheet information by themselves.

Further, image forming stations 304 to 307 each includes a photosensitive drum (photosensitive member) and form a toner image on the photosensitive drum using toners in different in color. More specifically, the image forming stations 304 to 307 form toner images using a yellow (Y) toner, a magenta (M) toner, a cyan (C) toner, and a black (K) toner, respectively.

The color toner images formed by the image forming stations 304 to 307 are sequentially transferred (primarily transferred) onto an intermediate transfer belt 308 in an overlapped manner. The toner image transferred onto the intermediate transfer belt 308 is conveyed to a secondary transfer position 309 by the rotation of the intermediate transfer belt 308. At the secondary transfer position 309, the toner image is transferred (secondarily transferred) from the intermediate transfer belt 308 onto the recording material conveyed through the conveyance path 303. The recording material subjected to the secondary transfer is conveyed to a fixing unit 311. The fixing unit 311 is provided with a pressure roller and a heating roller. Fixing processing to fix the toner image on the recording material is performed by applying heat and pressure to the recording material while the recording material is passing through between the pressure roller and the heating roller. The recording material that has passed through the fixing unit 311 is conveyed through a conveyance path 312' to a connection point 315 between the printing unit 107 and the diagnosis unit 108. In this way, a color image is formed (printed) on the recording material.

In a case where further fixing processing is required depending on a type of the recording material, the recording material that has passed through the fixing unit 311 is guided to a conveyance path 314 on which a fixing unit 313 is provided. The fixing unit 313 further performs fixing processing on the recording material being conveyed through the conveyance path 314. The recording material that has passed through the fixing unit 313 is conveyed to the connection point 315. Further, in a case where an operation mode for performing double-sided printing is set, an image is printed on a first surface of the recording material, and the recording material with the image printed thereon is conveyed through a conveyance path 312 or the conveyance path 314 and guided to a reversing path 316. The recording material reversed in the reversing path 316 is guided to a two-sided conveyance path 317, and conveyed to the secondary transfer position 309. In this way, at the secondary transfer position 309, a toner image is transferred onto a second surface opposite to the first surface of the recording material. Then, the formation of the color image on the second surface of the recording material is completed after the recording material has passed through the fixing unit 311 (and fixing unit 313).

The printed recording material on which the image formation (print) by the printing unit 107 has been completed, is conveyed to the connection point 315 and then conveyed to the diagnosis unit 108.

The diagnosis unit 108 is provided with image reading units 331 and 332 each including a contact image sensor (CIS) on a conveyance path 330 through which the printed recording material is conveyed from the printing unit 107. The image reading units 331 and 332 are disposed at opposing positions across the conveyance path 330. The image reading units 331 and 332 are configured to read the upper surface (first surface) and the lower surface (second surface) of the recording material, respectively. In addition, each of the image reading units 331 and 332 may be configured of, for example, a charge coupled device (CCD) sensor or a line scan camera, instead of the CIs.

The diagnosis unit 108 performs image diagnosis processing (image diagnosis) to determine whether a malfunction portion of the image forming apparatus 101 exists, based on the image printed on the recording material that is being conveyed through the conveyance path 330. More specifically, the diagnosis unit 108 performs reading processing to read the images of the printed recording material using the image reading units 331 and 332, at a timing at which the printed recording material that is being conveyed through the conveyance path 330 reaches a predetermined position.

The diagnosis unit 108 performs the image diagnosis processing based on an image diagnosis processing execution instruction from a user. The image diagnosis processing is desirably performed at a timing, for example, before the start of a printing job, or in a case where print defects have continuously occurred. The recording material that has passed through the diagnosis unit 108 is conveyed to the stacker 109 next.

The stacker 109 is provided with a stack tray 341 for stacking the print-completed recording material conveyed from the diagnosis unit 108 disposed on an upstream side in the conveyance direction of the printed recording material. The printed recording material that has passed through the diagnosis unit 108 is conveyed through a conveyance path 344 in the stacker 109. The printed recording material conveyed through the conveyance path 344 is guided to a conveyance path 345, and stacked on the stack tray 341.

The stacker 109 further includes an escape tray 346 as a sheet discharge tray. In the present embodiment, the escape tray 346 is used for discharging the recording material on which the test chart used for the image diagnosis by the diagnosis unit 108 is recorded. The printed recording material conveyed through the conveyance path 344 is guided to the conveyance path 347 to be conveyed to the escape tray 346. The printed recording material conveyed without being stacked on the stack tray 341 or discharged to the escape tray 346 in the stacker 109 is conveyed to the finisher 110 disposed at a subsequent stage through a conveyance path 348.

The stacker 109 further includes a reversing portion 349 for reversing the direction of the conveyance of the printed recording material. For example, the reversing portion 349 is used to match the direction of the recording material input to the stacker 109 and the direction of the printed recording material stacked on the stack tray 341 and to be output from the stacker 109. In addition, the reversing operation at the reversing portion 349 is not performed on the printed recording material to be conveyed to the finisher 110 without being stacked in the stacker 109.

The finisher 110 performs a finishing function designated by a user on the printed recording material conveyed from the diagnosis unit 108 disposed on the upstream side in the conveyance direction of the printed recording material. In the present embodiment, the finisher 110 has finishing functions, such as a stapling function (one or two position binding), a punching function (two or three holes), and a saddle stitch bookbinding function. The finisher 110 is provided with two discharge trays 351 and 352. In a case where the finishing processing is not performed by the finisher 110, the printed recording material conveyed to the finisher 110 is discharged to the discharge tray 351 through a conveyance path 353. In a case where the finishing processing, such as stapling processing, is performed by the finisher 110, the printed recording material conveyed to the finisher 110 is guided to a conveyance path 354. The finisher 110 performs a finishing processing designated by the user on the printed recording material conveyed through the conveyance path 354 using a finishing processing unit 355, and discharges the printed recording material with the finishing processing performed thereon to the discharge tray 352.

<Functional Configuration>

Figure 3:
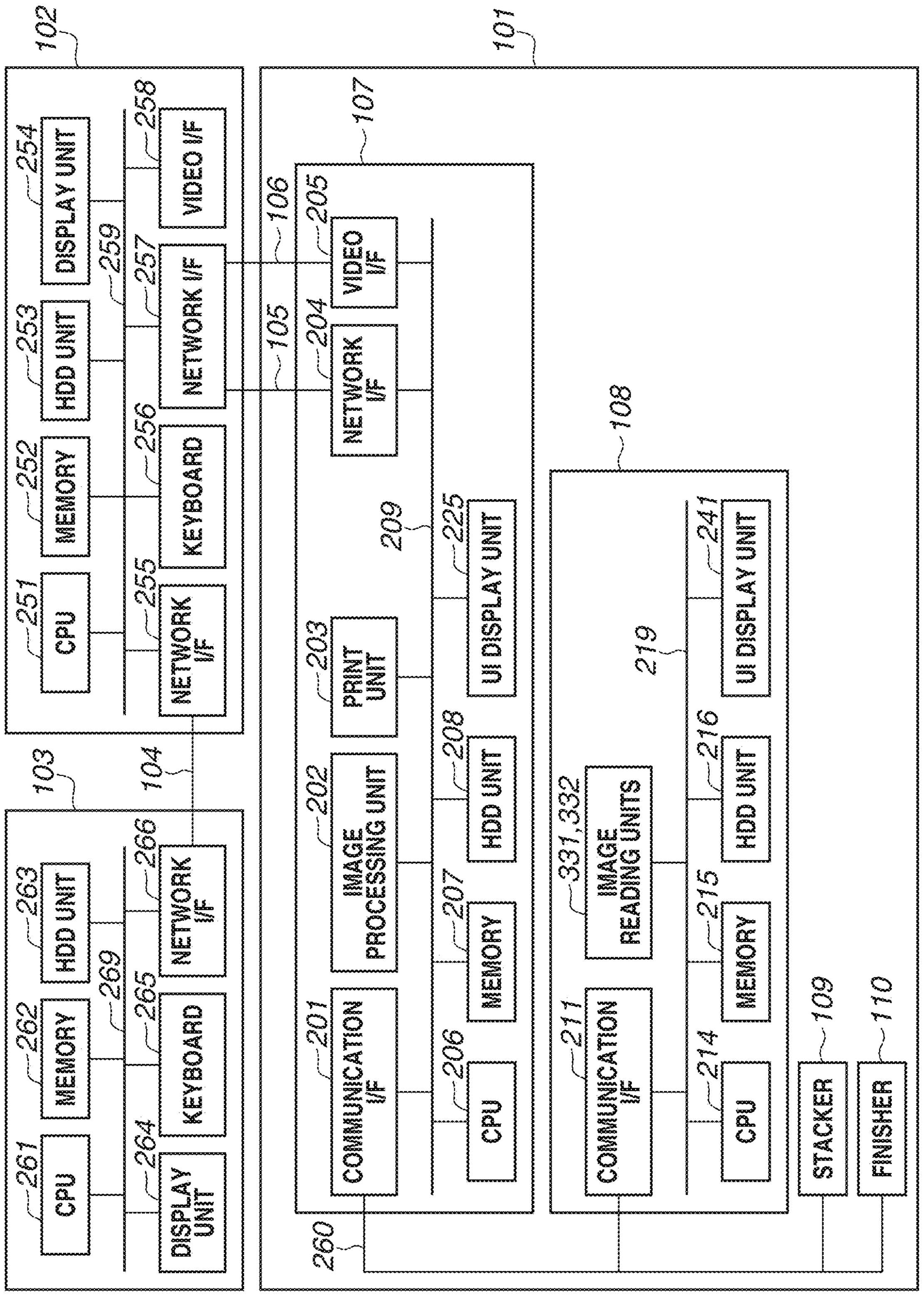
FIG. 3 is a block diagram illustrating internal configurations of the image forming apparatus, an external controller, and a client personal computer (PC).

FIG. 3 is a block diagram schematically illustrating functional configurations of the image forming apparatus 101, the external controller 102, and the client PC 103.

The printing unit 107 of the image forming apparatus 101 includes a communication interface (I/F) 201, a network I/F 204, a video I/F 205, a central processing unit (CPU) 206, a memory 207, a hard disk drive (HDD) unit 208, and a user interface (UI) display unit 225. The printing unit 107 further includes an image processing unit 202 and a print unit 203. These components are connected with each other to be able to transmit and receive data to and from each other via a system bus 209. The communication I/F 201 is connected with the diagnosis unit 108, the stacker 109 and the finisher 110 via a communication cable 260. The CPU 206 performs communication via the communication I/F 201 to control the apparatuses. The network I/F 204 is connected with the external controller 102 via the internal LAN 105 and is used to communicate control data and the like with the external controller 102. The video I/F 205 is connected with the external controller 102 via the video cable 106 and is used to communicate data, such as image data, with the external controller 102. In addition, the printing unit 107 (image forming apparatus 101) and the external controller 102 may be connected only via the video cable 106, as long as the external controller 102 can control the operation of the image forming apparatus 101. The HDD unit 208 stores various kinds of programs or data. The CPU 206 executes a program stored in the HDD unit 208 to control the entire operation of the entire printing unit 107. The memory 207 stores programs and data to be required when the CPU 206 executes various kinds of processing. The memory 207 operates as a work area for the CPU 206. The UI display unit 225 is used to receive inputs of various kinds of settings and instructions for operations from a user, and to display various kinds of information, such as setting information and a print job processing status. For example, the UI display unit 225 receives various kinds of instructions from a user, such as a diagnosis execution instruction, diagnosis settings, and sheet information settings.

The diagnosis unit 108 includes a communication I/F 211, a CPU 214, a memory 215, an HDD unit 216, the image reading units 331 and 332, and a UI display unit 241. These devices are connected with each other so as to be able to transmit and receive data to and from each other via a system bus 219. The communication I/F 211 is connected with the printing unit 107 via the communication cable 260. The CPU 214 performs communication required to control the diagnosis unit 108 via the communication I/F 211. The CPU 214 executes a control program stored in the memory 215 to control the operations of the diagnosis unit 108. The memory 215 stores control programs for the diagnosis unit 108. The image reading units 331 and 332 read images on both sides of the conveyed recording material based on an instruction of the CPU 214. The CPU 214 diagnoses whether a malfunction portion of the image forming apparatus 101 exists, based on the images for diagnosis read by the image reading units 331 and 332. The UI display unit 241 is used to display, for example, a diagnosis result and a setting screen. The UI display unit 241 also serves as the operation unit, is operated by a user, and receives various instructions from a user, such as an instruction to change settings of the diagnosis unit 108, and an execution instruction of an image diagnosis. The HDD unit 216 stores various kinds of setting information required for the image diagnosis, and image data. The various kinds of setting information and the image data stored in the HDD unit 216 are reusable.

The stacker 109 controls the printed recording material conveyed through the conveyance path to discharge to the stack tray 341 or to the escape tray 346, or to convey to the finisher 110 connected on the downstream side in the conveyance direction of the printed recording material.

The finisher 110 controls the conveyance and the discharge of the printed recording material, and performs finishing processing, such as stapling, punching, and saddle stitching bookbinding, on the printed recording material.

The external controller 102 includes a CPU 251, a memory 252, an HDD unit 253, a keyboard 256, a display unit 254, network I/Fs 255 and 257, and a video I/F 258. These devices are connected with each other via a system bus 259 so as to be able to transmit and receive data to and from each other. The CPU 251 executes a program stored in the HDD unit 253 to control the entire operation of the entire external controller 102, such as reception of print data from the client PC 103, raster image processor (RIP) processing, and transmission of print data to the image forming apparatus 101. The memory 252 stores programs and data to be required when the CPU 251 performs various kinds of processing. The memory 252 operates as a work area for the CPU 251.

The HDD unit 253 stores various kinds of programs and data. The keyboard 256 is used to input operation instructions to the external controller 102 by a user. The display unit 254 is, for example, a display, and is used to display information about an application being executed in the external controller 102, and an operation screen. The network I/F 255 is connected with the client PC 103 via the external LAN 104, and is used to communicate data, such as a print instruction, with the client PC 103. The network I/F 257 is connected with the image forming apparatus 101 via the internal LAN 105, and is used to communicate data, such as a print instruction, with the image forming apparatus 101. The external controller 102 is configured to communicate with the printing unit 107, the diagnosis unit 108, the stacker 109 and the finisher 110 via the internal LAN 105 and the communication cable 260. The video I/F 258 is connected with the image forming apparatus 101 via the video cable 106, and is used to communicate data, such as image data (print data), with the image forming apparatus 101.

The client PC 103 includes a CPU 261, a memory 262, an HDD unit 263, a display unit 264, a keyboard 265, and a network I/F 266. These devices are connected with each other so as to be able to transmit and receive data to and from each other via a system bus 269. The CPU 261 executes a program stored in the HDD unit 263 to control operations of the devices via the system bus 269. In this way, various kinds of processing are implemented by the client PC 103.

For example, the CPU 261 executes a document processing program stored in the HDD unit 263 to generate a print data and issue a print instruction. The memory 262 stores programs and data to be required when the CPU 261 performs various kinds of processing. The memory 262 operates as a work area for the CPU 261.

The HDD unit 263 stores, for example, various kinds of applications such as a document processing program, programs such as a printer driver, and various kinds of data. The display unit 264 is, for example, a display, and is used to display information about an application being executed in the client PC 103, and an operation screen. The keyboard 265 is used to input an operation instruction to the client PC 103 by a user. The network I/F 266 is communicably connected with the external controller 102 via the external LAN 104. The CPU 261 communicates with the external controller 102 via the network I/F 266.

<Image Diagnosis Processing>

Figure 4:
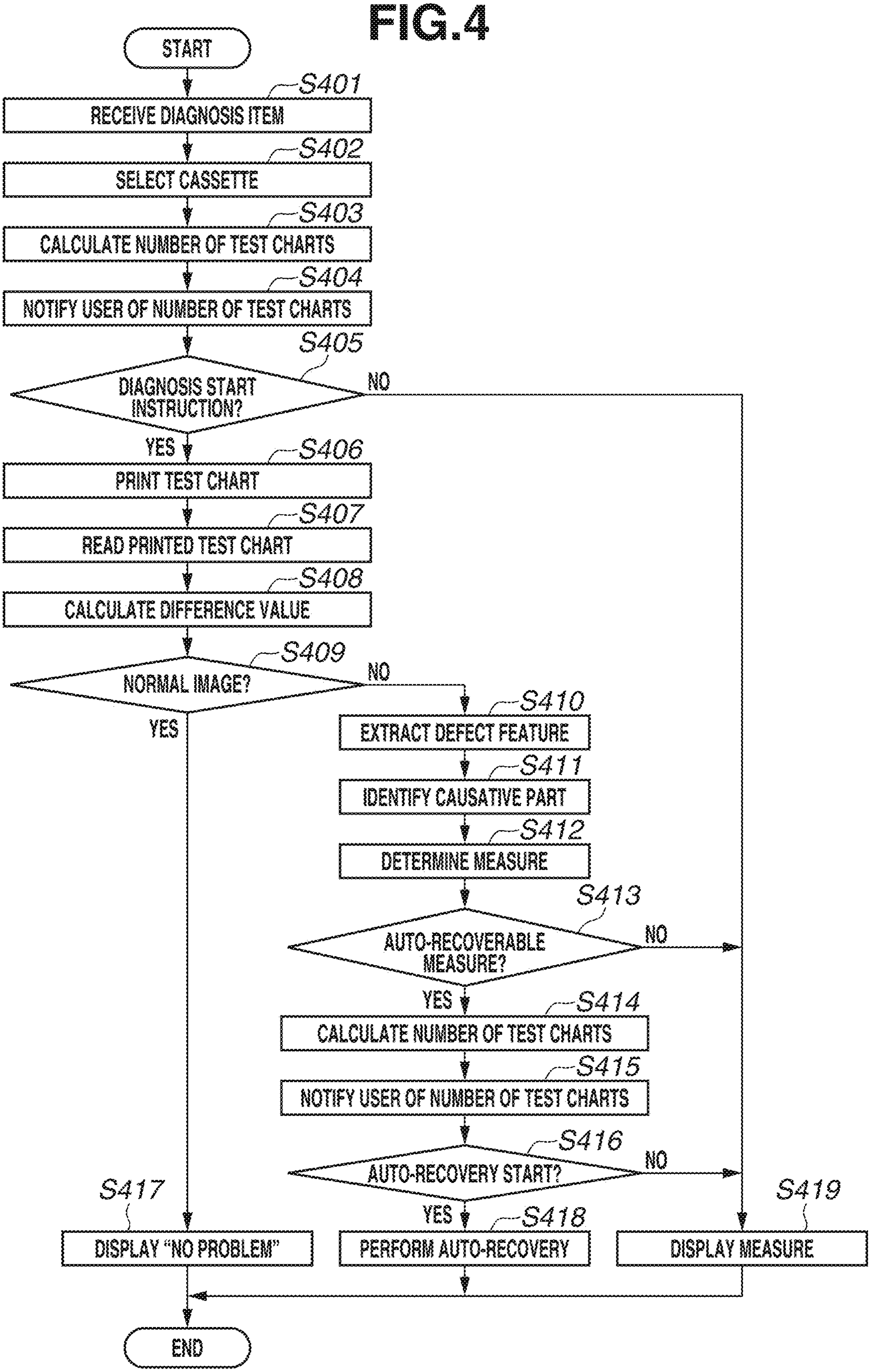
FIG. 4 is a flowchart illustrating a procedure of image diagnosis processing.

The image diagnosis processing according to the present embodiment will be described with reference to FIGS. 4 to 11. FIG. 4 is a flowchart illustrating a printing operation procedure executed by the printing unit 107 and an image diagnosis processing procedure executed by the diagnosis unit 108. FIG. 4 illustrates an entire flow from an operation before the start of an image diagnosis to the execution of a diagnosis. The processing in each step in FIG. 4 is executed by the CPU 206 of the printing unit 107 and the CPU 214 of the diagnosis unit 108.

In step S401, the printing system 100 receives an instruction for an image diagnosis from a user or a service person via the UI display unit 241 also serving as the operation unit, and checks settings for the image diagnosis processing. In the present embodiment, a timing to start the image diagnosis processing is, for example, a timing after the main body is powered on and activated. After the activation, the printing system 100 displays a notification to a user on at least one of the UI display unit 241, the display unit 254 of the external controller 102, and the UI display unit 225 of the printing unit 107 in order to prompt the user to issue an instruction to start a diagnosis. However, the timing to start the image diagnosis processing is not limited to the above-described example. The printing system 100 may prompt the user to start image diagnosis processing, in a case where the printing system 100 also has a checking function to check whether a print defect of a printed recording material exists and print defects are continuously detected by the checking function. Further, other than the timing of activation of the main body, a time to display a notification to prompt the execution of the image diagnosis processing may be set on a timer, the notification may be displayed at the set time.

Figure 5:
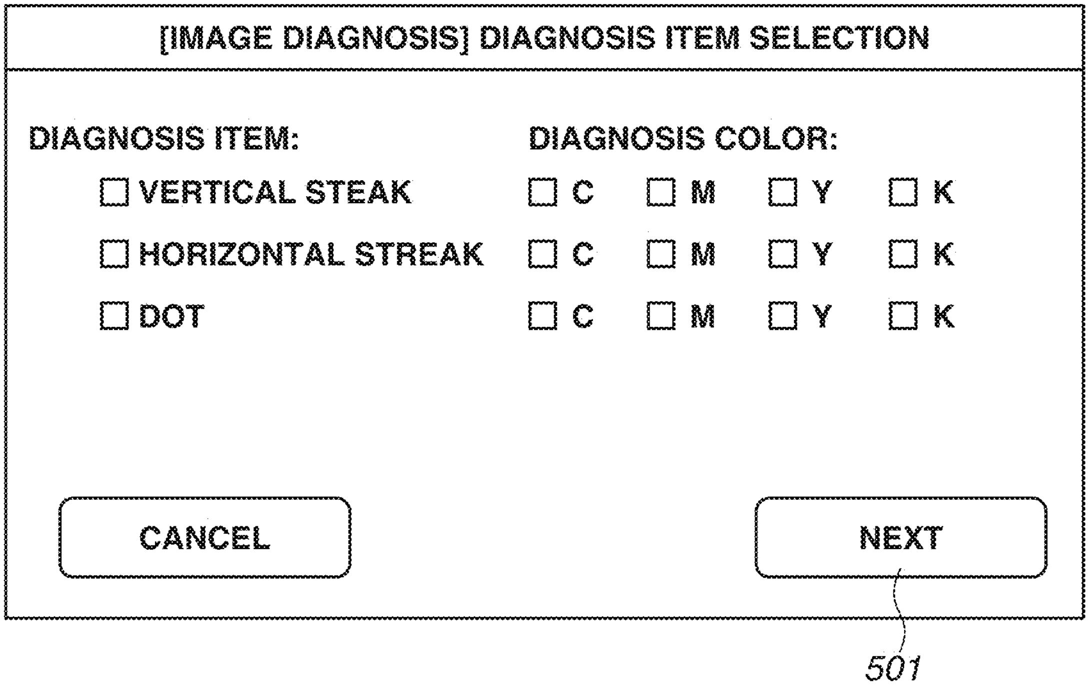
FIG. 5 is a diagram illustrating an example of a diagnosis item selection screen.

When the user confirms the notification to prompt the user to start the diagnosis, the CPU 214 displays a screen to receive selections of diagnosis conditions from the user on the UI display unit 241, receives the selections of the diagnosis conditions, and holds the received diagnosis conditions in the HDD unit 216. A schematic diagram of the screen for receiving the diagnosis conditions from the user is illustrated in FIG. 5. As the diagnosis items, the CPU 214 allows the user to select a shape of each defect to be diagnosed, and a color material to be diagnosed for each shape of the defect. As illustrated in FIG. 5, the CPU 214 prepares a check box for each condition, and holds the conditions checked when the user presses a next button 501, in the HDD unit 216 as the diagnosis conditions. Upon holding the diagnosis conditions, the processing proceeds to step S402, in which a sheet feeding deck is selected.

In step S402, the CPU 251 of the external controller 102 receives a selection of a sheet feeding deck in which sheets for printing test charts for diagnosis (diagnosis image) are stored. The CPU 251 displays a screen for receiving a selection of a position of the sheet feeding deck mounted on the image forming apparatus 101, on the UI display unit 241. The user selects the position of the sheet feeding deck in which sheets for printing the test charts are stored, from among the sheet feeding decks 361 to 366 mounted on the image forming apparatus 101.

In step S403, the CPU 251 of the external controller 102 performs calculation processing of the number of test charts required for the image diagnosis. In the calculation processing of the number of test charts, the CPU 251 of the external controller 102 calculates the number of test charts to be output by the test chart print processing in step S406, based on the image diagnosis conditions. Details of the calculation processing of the number of test charts required for the image diagnosis are described below.

In step S404, the CPU 251 of the external controller 102 notifies a user of the number of test charts. The notification of the number of test charts is made by, for example, performing control to display a screen illustrated in FIG. 6 on the UI display unit 241, and performing control to display in an area 601 the number of test charts (number of output sheet) calculated in step S403. Then, the processing proceeds to step S405 to receive an image diagnosis start instruction or an image diagnosis cancel instruction. With this processing, the user can confirm the number of test charts to be output before the test charts for the image diagnosis start to be output.

In step S405, the CPU 214 receives an image diagnosis start instruction or an image diagnosis cancel instruction. The image diagnosis start instruction is given by, for example, pressing a start button 602 illustrated in FIG. 6. In step S405, in a case where the CPU 214 receives the image diagnosis start instruction (YES in step S405), the processing proceeds to step S406. In step S406, CPU 214 starts printing the test charts. The image diagnosis cancel instruction is given by, for example, pressing a cancel button 603 illustrated in FIG. 6. In a case where the CPU 214 receives the image diagnosis cancel instruction (NO in step S405), the processing proceeds to step S419. In step S419, the CPU 214 displays a measure, and then, the image diagnosis processing ends.

Figure 10:
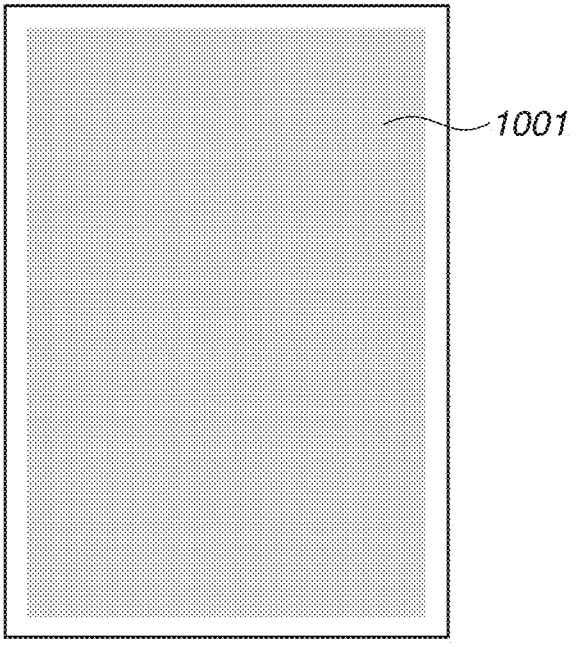
FIG. 10 is a diagram illustrating an example of a test chart used for the image diagnosis processing.
Figure 11:
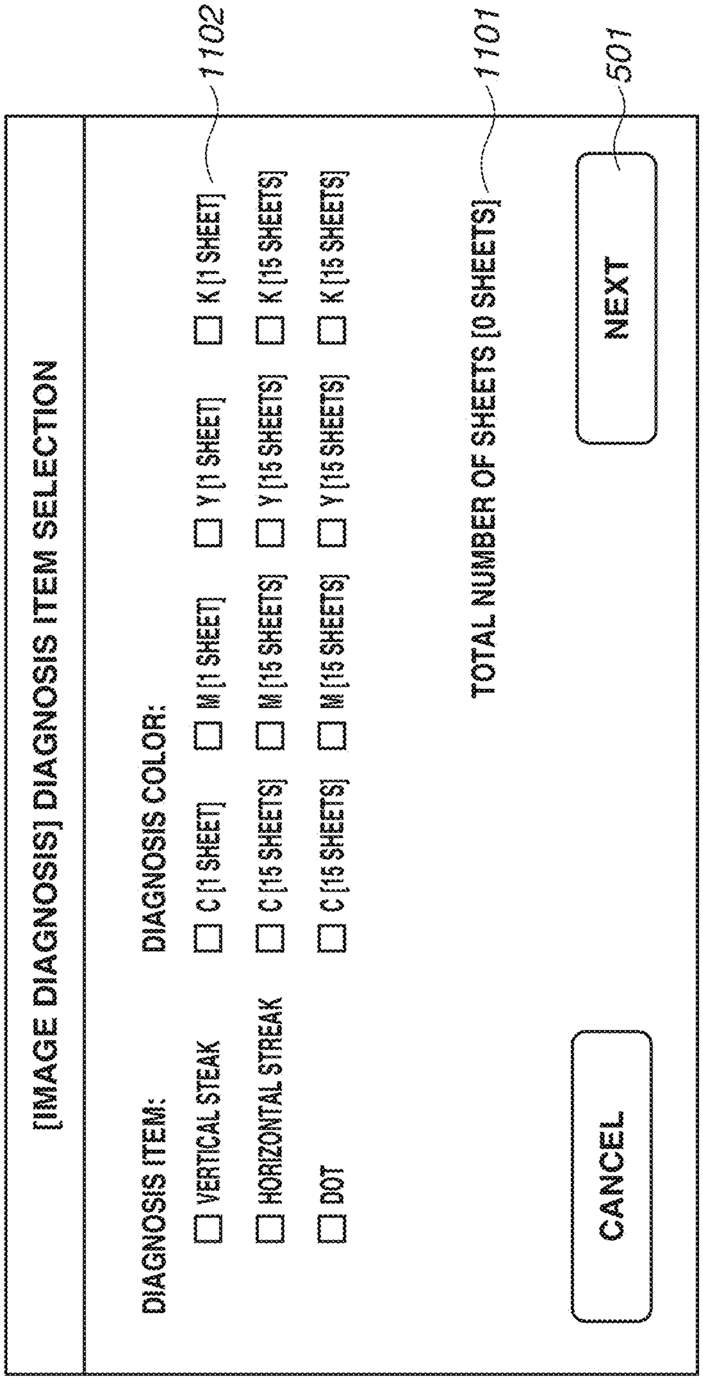
FIG. 11 is a diagram illustrating an example of a diagnosis item selection screen.

In step S406, the CPU 251 of the external controller 102 reads a test chart stored in advance, rasterizes the read test chart into a bitmap, and generates the rasterized bitmap of the test chart as a reference image. The test chart is an image used for diagnosing a malfunction of the image forming apparatus (hereinbelow, also referred to as a test image). FIG. 10 is a diagram illustrating an example of a test chart used for the image diagnosis processing according to the present embodiment. An image portion 1001 illustrates an area in which an image is formed using a color material. For example, the image portion 1001 is a single color image having the image area ratio of 50%, and the total of four types of test charts are printed using each one of cyan (C), magenta (M), yellow (Y), and black (K)based on the number of sheets calculated in step S403. The CPU 251 transmits the rasterized bitmap data of the test charts to the video I/F 205 of the printing unit 107 from the video I/F 258 via the video cable 106. The CPU 206 of the printing unit 107 performs halftone processing on the bitmap data on the test charts received by the video I/F 205, and prints the test charts based on the halftone processed image data in the print unit 203. In addition, the configuration of the test chart is merely an example, and not limited to the above-described example. On condition that a defect or malfunction of the printing unit 107 become apparent or revealed using a difference image (described below), the ratio between the image portion 1001 and the non-image portion, and the area ratio may be different, and the image portion 1001 may be an image portion using two or more color materials.

In step S407, the CPU 214 of the diagnosis unit 108 performs processing of reading the printed test charts by the image reading units 331 and 332. The read images of the test charts are stored in the HDD unit 216 of the diagnosis unit 108, as diagnosis images. After the diagnosis images are stored, the processing proceeds to step S408.

In step S408, the CPU 214 compares the reference image and the read images to determine a malfunction of the printing unit 107. In the present embodiment, the CPU 214 compares the reference image and each read image to calculate a difference value.

In a case where the calculated difference value exceeds a threshold value determined in advance, the CPU 214 determines that a difference exists, and sets "1" to difference image data. On the other hand, in a case where the calculated difference value is below the threshold value, "0" is set to the difference image data.

In addition, the calculation method of the difference image data is not limited to the above-described example. In the present embodiment, the description is given of the example in which a reference image and a read image are compared to calculate a difference value. However, an average value may be calculated from read images, and a difference value is calculated using the average value as a reference signal. Alternatively, a value that can estimated as a reference signal may be held in the HDD unit 216 in advance. Further, the diagnosis unit 108 may include a correction unit for correcting the nonlinearity between a signal value of a read image obtained by the image reading unit 331 and brightness, to calculate difference image data after correcting the signal value of the read image. The CPU 214 stores the difference image data, which is binary data indicating whether there is a difference, in the HDD unit 216, and then, the processing proceeds to step S409.

Upon completing the generation of the difference image data, in step S409, the CPU 214 determines whether the image forming apparatus 101 is operating normally. The determination is made based on whether data including "1" exists in the difference image data. In a case where the CPU 214 determines that the image forming apparatus 101 is operating normally (YES in step S409), the processing proceeds to step S417. In step S417, the CPU 214 displays a diagnosis result "No Problem" indicating that the diagnosis result is normal, on the UI display unit 241 of the diagnosis unit 108. On the other hand, in a case where the CPU 214 determines that the image forming apparatus 101 is not operating normally, i.e., the difference image data includes "1" (NO in step S409), the processing proceeds to step S410. In the processing performed in step S410 and subsequent steps, the CPU 214 identifies a defect part in the image forming apparatus 101 based on the read image data and the difference image data, and instructs a measure.

In step S410, the CPU 214 extracts a feature amount for identifying the defect or malfunction part in the printing unit 107 based on the read image data and the difference image data. The CPU 214 extracts a feature of the difference from the read image corresponding to a difference area determined that "a difference exists", which is calculated from the difference image data in step S408. Examples of feature information of the difference area obtained by this extraction processing include color material information indicating in which color of yellow, magenta, cyan, and black the defect has occurred. Further, examples of the difference information of the difference area include contrast information in which a defect density contrast is indicated by a positive or negative numerical value expressing whether the difference is in a direction (+ direction) where the density increases or in a direction (− direction) where the density decreases. Furthermore, examples of the feature information of the difference area include size information such as a width (size in a main scan direction) and a height (size in a sub-scan direction) of a defect, and shape information such as a dot shape, a vertical streak shape, and a horizontal streak shape. Examples of the feature information of the difference area further include coordinate information indicating a position in a direction perpendicular to the conveyance direction of the test chart in the printing unit 107, and period information indicating that similar defects having the feature are periodically generated in the conveyance direction of the test chart in the printing unit 107. The CPU 214 stores the extracted feature in the HDD unit 216, and the processing proceeds to step S411.

In step S411, the CPU 214 identifies a part (region) that causes an image defect in the printing unit 107 and the image reading unit 331, based on the feature information of the difference area obtained in step S410. From among the difference areas, the CPU 214 selects a combination of difference areas of the same color with the highest similarity, and identifies which part causes the malfunction from the period information of the selected combination.

In step S412, the CPU 214 determines a measure for the image defect, based on the part that causes the image defect identified in step S411. The measure is classified into a measure that allows automatic recovery (auto-recoverable measure) and a measure that does not allow the automatic recovery (auto-unrecoverable measure). Examples of the auto-recoverable measure include an auto-recoverable measure in the printing unit 107, such as cleaning of a wire or a grid of a corona charger that is a charging unit of the photoconductive drum provided in each of the image forming stations 304 to 307 of the printing unit 107. There are following two examples as the auto-unrecoverable measures. First, for example, there is a measure requiring a user's work, such as cleaning dirty reading glass surfaces of the image reading units 331 and 332 of the diagnosis unit 108, and adjusting the recording materials to be used, or requiring a service person's work, such as replacing a part. Second, for example, there is a measure for the reading abnormality of the image reading units 331 and 332, or a measure for fibers or foreign particles included in the recording material before the image formation.

Next, in step S413, the CPU 214 determines whether the measure determined in step S412 is an auto-recoverable measure. In a case where the CPU 214 determines that the measure is an auto-recoverable measure (YES in step S413), the processing proceeds to step S414.

In step S414, the CPU 251 of the external controller 102 performs calculation processing of the number of test charts (images for recovery) required for the auto-recovery (automatic correction). In the calculation processing of the number of test charts, the CPU 251 calculates the number of test charts to be output in auto-recovery processing in step S418, based on the auto-recovery conditions. Details of the calculation processing of the number of test charts will be described below.

In step S415, the CPU 251 of the external controller 102 performs notification of the number of test charts required for the auto-recovery. The notification of the number of test charts is performed, for example, by displaying a screen illustrated in FIG. 7 on the UI display unit 241 to display in an area 701 the number of test charts calculated in step S414. Then, the processing proceeds to step S416, and the CPU 214 receives an instruction to start or cancel the auto-recovery. With this processing, a user can confirm the number of test charts to be output, before the test charts for the auto-recovery start to be output.

In step S416, the CPU 214 receives an auto-recovery start instruction or an auto-recovery cancel instruction. The auto-recovery start instruction is given by, for example, pressing a start button 702 illustrated in FIG. 7. In a case where the CPU 214 receives the auto-recovery start instruction (YES in step S416), the processing proceeds to step S418 to start printing the test charts. The auto-recovery cancel instruction is given by, for example, pressing a cancel button 703 illustrated in FIG. 7. In a case where the CPU 214 receives the auto-recovery cancel instruction (NO in step S416), the processing proceeds to step S419, a measure is displayed and then, the image diagnosis processing ends.

In step S418, the CPU 214 executes an auto-recovery control to correct the cause of the image defect.

On the other hand, in a case where the CPU 214 determines that the measure determined in step S413 is not an auto-recoverable measure (NO in step S413), the processing proceeds to step S419. In step S419, the CPU 214 displays the image diagnosis result and the measure method on the UI display unit 241 of the diagnosis unit 108. In a case where any one of the processes in steps S417, S418, and S419 is completed, the flow (flow of image diagnosis processing) illustrated in FIG. 4 ends.

<Calculation of Number of Test Charts Required for Image Diagnosis>

In step S403, the CPU 251 calculates the number of test charts required for the image diagnosis based on the diagnosis conditions. In the present embodiment, the diagnosis conditions include diagnosis item information, diagnosis color information, sheet size information, and model type information. In the present embodiment, the CPU 214 receives designation of a defect shape as a diagnosis item. Examples of the shape of the defect include three types, i.e., a vertical streak, a horizontal streak, and a dot. In the diagnosis based on a vertical streak, the diagnosis unit 108 performs diagnosis on the defect of the streak in the sub-scanning direction to identify a part that causes the defect. Since it is not required to check the periodicity, one chart is only required for each diagnosis color. On the other hand, in the diagnosis based on a horizontal streak and the diagnosis based on a dot, since it is required to check the periodicity, outputting a plurality of test charts is required in some cases. The number of test charts required to determine the periodicity is different depending on the part period of the printing unit 107, and is also different depending on the length of a used sheet in the sub-scanning direction.

Accordingly, the CPU 214 determines the number of sheets with reference to a table of diagnosis conditions held in advance. FIG. 8 is a schematic diagram illustrating a table for determining the number of required sheets from the diagnosis item information, the diagnosis color information, the sheet size information, and the model type information. For example, for a model A, in a case where the diagnosis condition is set to perform a diagnosis for a horizontal streak of cyan (C) using A4 sheets, the CPU 214 determines the number of required sheets to be 15, with reference to a field 801. In a case where a plurality of conditions is ON, the CPU 214 determines the number of required sheets by adding up the numbers of required sheets for all conditions. For example, for the model A, in a case where the diagnosis conditions are set to perform diagnoses for horizontal streaks of cyan (C) and black (K) using A4 sheets, the CPU 214 determines the number of required sheets to be 30 by adding up the numbers of sheets, i.e., 15 sheets and 15 sheets with reference to fields 801 and 802. On the other hand, even in a case where the conditions are different, if the test charts to be used are the same and only the numbers of sheets are different, the CPU 214 selects the larger number of sheets without adding up the numbers of sheets as a required number of sheets. For example, for the model A, in a case where the diagnosis condition is set to perform diagnoses for a vertical streak and a dot of cyan (C) using A4 sheets, the number of sheets required for the vertical streak diagnosis is 1 as illustrated in a field 803, and the number of sheets required for the dot diagnosis is 15 sheets as illustrated in a field 804. In a case where the charts used for these diagnoses are the same and the numbers of sheets are different, the CPU 214 determines that the number of required sheets is 15 sheets, which is larger one between them. In this case, the first sheet to be output may be used for the vertical streak diagnosis, and the first to the fifteenth sheets may be used for the dot diagnosis.

In addition, the setting method of the diagnosis conditions is not limited to the method of referring to the table, and any method can be used as long as the number of required sheets can be calculated. For example, a method of holding part information for each model type in advance may be used to calculate the number of sheets.

Further, in the present embodiment, the example of designating the defect shape is described as the diagnosis item, but a part to be diagnosed may be selected. For example, diagnosis target parts, such as a "photosensitive drum" and an "intermediate transfer belt", may be displayed on the UI as diagnosis items, and the number of required test charts may be calculated depending on a part selected by a user and displayed.

<Calculation Processing of Number of Test Charts Required for Auto-Recovery>

In step S414, the CPU 251 calculates the number of required test charts for the auto-recovery, based on the recovery conditions. In the present embodiment, the recovery conditions include auto-recovery item information, the sheet size information, and the model type information. In the present embodiment, the CPU 251 receives the determination result indicating the auto-recoverable measure obtained in step S412, as an auto-recovery item. The number of test charts required for the auto-recovery is different depending on the auto-recovery item information, the sheet size information, and the model type information. For example, in a case where the cause of a dot is the photosensitive drum, and the photosensitive drum is recovered by idle rotations of the photosensitive drum, a test chart is output to check whether the dot has disappeared by the recovery. The number of sheets required to check whether the periodically generated defects have disappeared is different depending on the cycle of part, and is also different depending on the length of the used sheet in the sub-scanning direction. Further, depending on the auto-recovery item, there may be a case where a test chart is required not only for checking but also for recovery.

Thus, the number of sheets is determined with reference to the recovery condition table held in advance. FIG. 9 is a schematic diagram illustrating a table used for determining the number of required sheets from the auto-recovery item information, the sheet size information, and the model type information. For example, for the model A, in a case where the auto-recovery condition is set to perform an secondary transfer current adjustment using A4 sheets, the required number of sheets is determined to be 3 by adding the numbers of sheets to be used for the adjustment and for the confirmation with reference to fields 901 and 902. In a case where a plurality of conditions is ON, the numbers of required sheets for all the conditions are added to determine the number of required sheets. For example, for the model A, in a case where the auto-recovery condition is set to perform secondary transfer current adjustment and drum idle rotation using A4 sheets, the number of required sheets is determined to be 5 by adding up the numbers of sheets in fields 901, 902, 903, and 904. Further, in a case where a retry is performed when the recovery is determined to be not successful in the confirmation of the auto-recovery processing, the number of required sheets may be determined in consideration of the maximum number of times of retries. For example, the maximum number of times of retries is 3, the number of required sheets is multiplied by 3.

However, the setting method of the recovery condition is not limited to the method of referring to the table, and any method can be used as long as the number of required sheets can be calculated. For example, a method of holding part information in advance for each model type may be used to calculate the number of required sheets.

As described above, in the present embodiment, the number of sheets is determined based on the diagnosis conditions, and the user is notified of the number of sheets used for the image diagnosis. It is possible to reduce consumption of sheets that is not intended by the user by performing the notification.

Modification Example of First Embodiment

Figure 6:
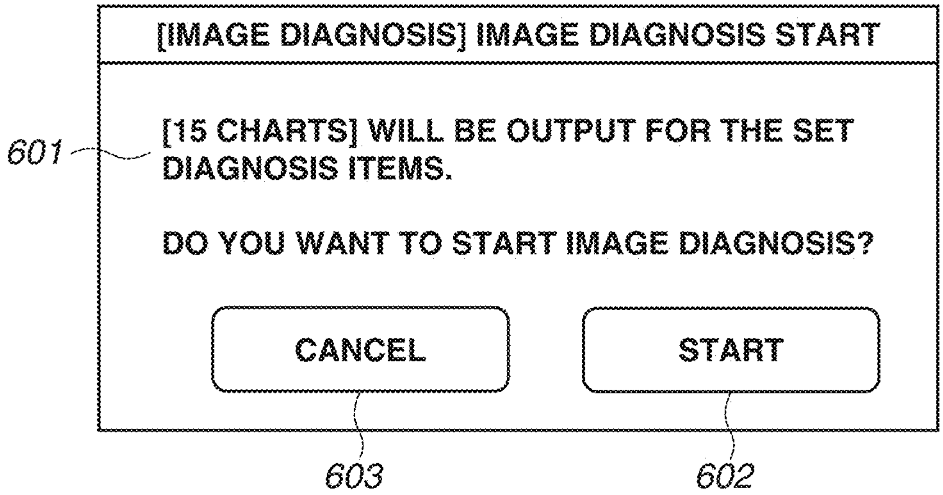
FIG. 6 is a diagram illustrating an example of a notification screen displaying the number of test charts to be used for the image diagnosis processing.
Figure 7:
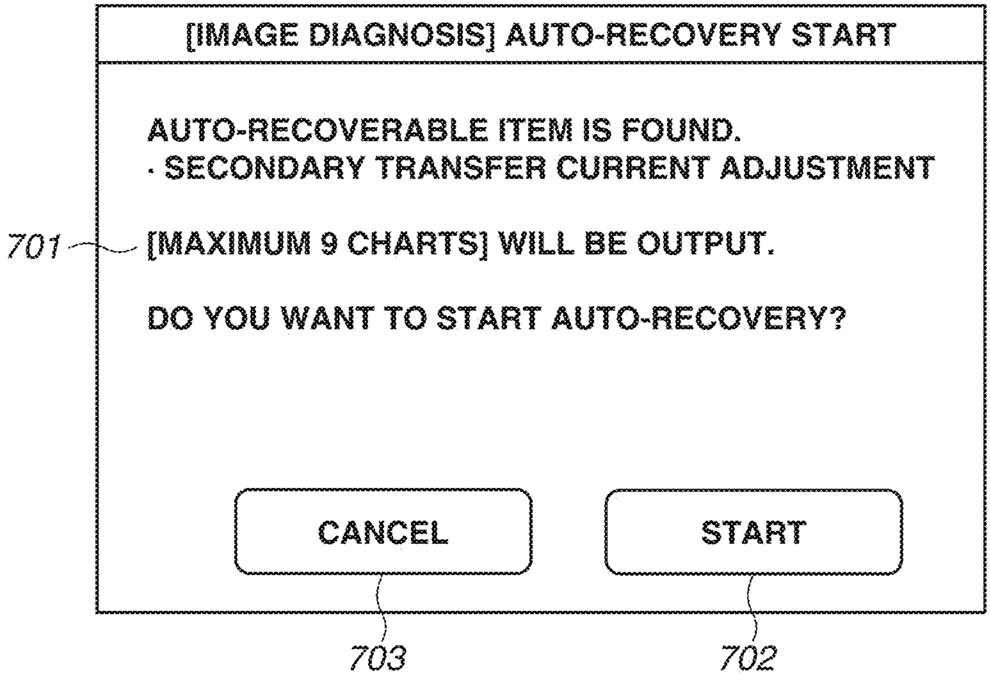
FIG. 7 is a diagram illustrating an example of a notification screen displaying the number of test charts to be used for automatic recovery (auto-recovery) processing.

In the present embodiment, the description is given of the example in which the user is notified of the number of sheets to be used for the image diagnosis by displaying the screen exemplified in FIG. 6 when the next button 501 is pressed after the user selects the diagnosis conditions on the selection screen of the diagnosis conditions exemplified in FIG. 5. However, the present embodiment is not limited to the above-described example. For example, without displaying the notification screen in FIG. 6, the notification may be performed by displaying the number of sheets to be used for the image diagnosis on a selection screen of diagnosis conditions exemplified in FIG. 11. The calculation of the numbers of test charts required for the respective items of the above-described image diagnosis is sequentially performed depending on the user's selection of the diagnosis items, and the result of the calculation is displayed in an area 1101. Further, as exemplified in an area 1102, the number of required test charts for each of the diagnosis items and diagnosis colors may be displayed in the corresponding selection field.

Figure 12:
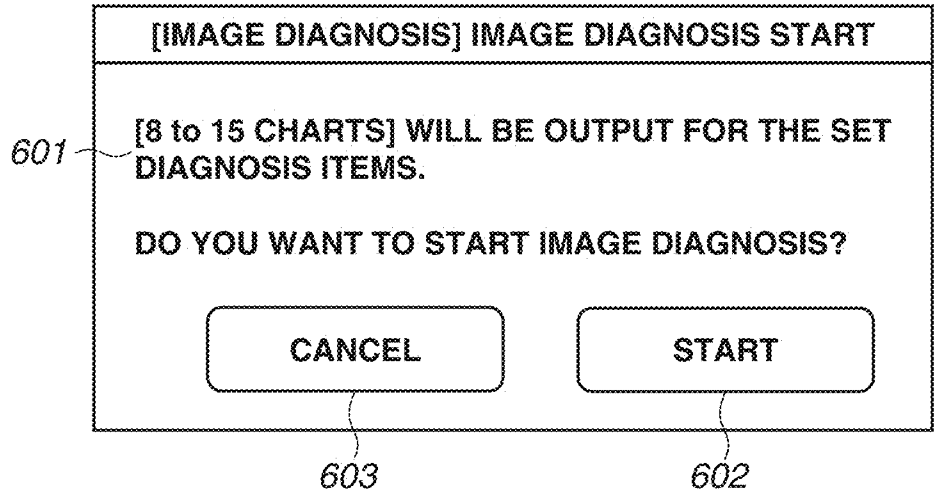
FIG. 12 is a diagram illustrating an example of a notification screen displaying a range of the numbers of test charts to be used for image diagnosis processing in a modification example of the first embodiment.

In addition, in the present embodiment, the description is given of the example in which the calculation of the number of test charts required for the image diagnosis and the calculation of the number of test charts required for the auto-recovery are performed after the diagnosis conditions and the recovery conditions are determined, but the present invention is not limited to the above-described example. For example, in a configuration in which the cassette is selected after the notification of the number of test charts required for the image diagnosis, the sheet size is not determined at the time of performing the calculation processing of the number of test charts required for the image diagnosis. Thus, in a case of performing the diagnosis of a horizontal streak of cyan (C) in the model A, the number of test charts can be 8 to 15 sheets. In this case, as exemplified in the area 601 in FIG. 12, the possible range may be displayed.

Figure 13:
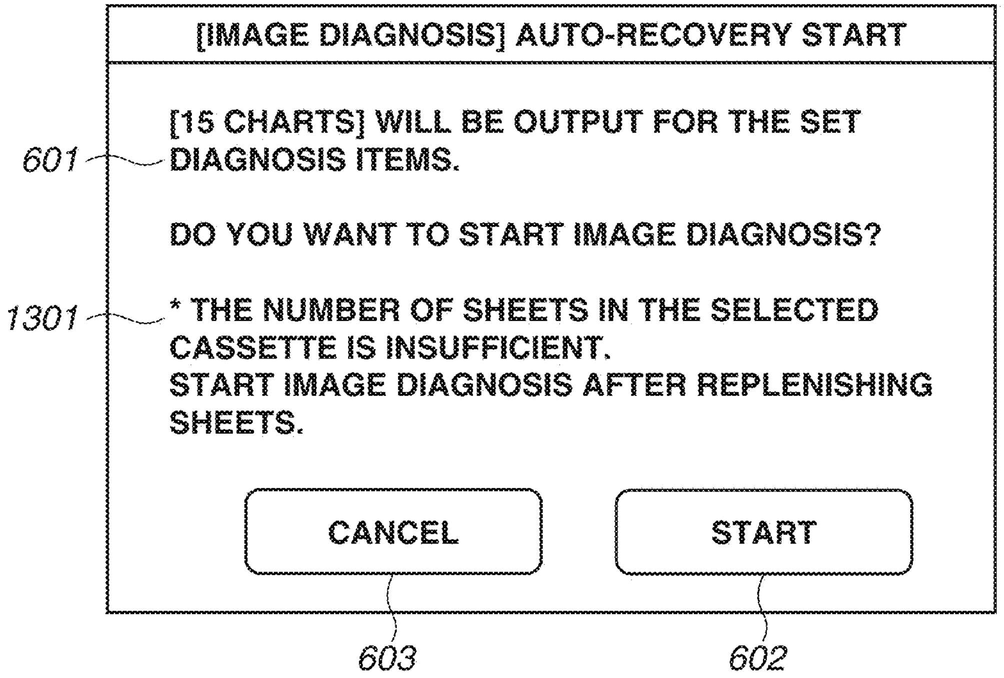
FIG. 13 is a diagram illustrating an example of a warning message screen displayed at the time of notification of the number of test charts used for the image diagnosis processing according to the modification example of the first embodiment.

In addition, in the present embodiment, the description is given of the configuration in which the user is notified of the calculated number of test charts required for the image diagnosis and the number of test charts required for the auto-recovery by displaying them, but the effect of the present embodiment is not limited to the above-described example. For example, in a case where the number of sheets in the cassette selected in step S402 is less than the calculated number of test charts required for the image diagnosis, a warning message exemplified in an area 1301 in FIG. 13 may be displayed to prompt the user to replenish sheets.

In addition, in the present embodiment, the description is given of the configuration in which the user is always notified of the calculated number of test charts required for the image diagnosis and the number of test charts required for the auto-recovery, but the effect of the present embodiment is not limited to the above-described example. For example, the notification of the number of test charts in step S404 and the notification of the number of test charts in step S415 may be performed only when the number of test charts exceeds a predetermined number of sheets.

Image diagnosis processing according to a second embodiment will be described. In the first embodiment, the description is given of the example in which the diagnosis items and the diagnosis colors selected and determined by the user are received, and the number of test charts is calculated, when the image diagnosis processing is performed. However, the effect of the first embodiment is not limited to the above-described example. For example, before the image diagnosis is performed, the diagnosis items and the diagnosis colors may be automatically determined by performing a simple image diagnosis with a smaller number of test charts than the number of test charts described above.

Figure 14:
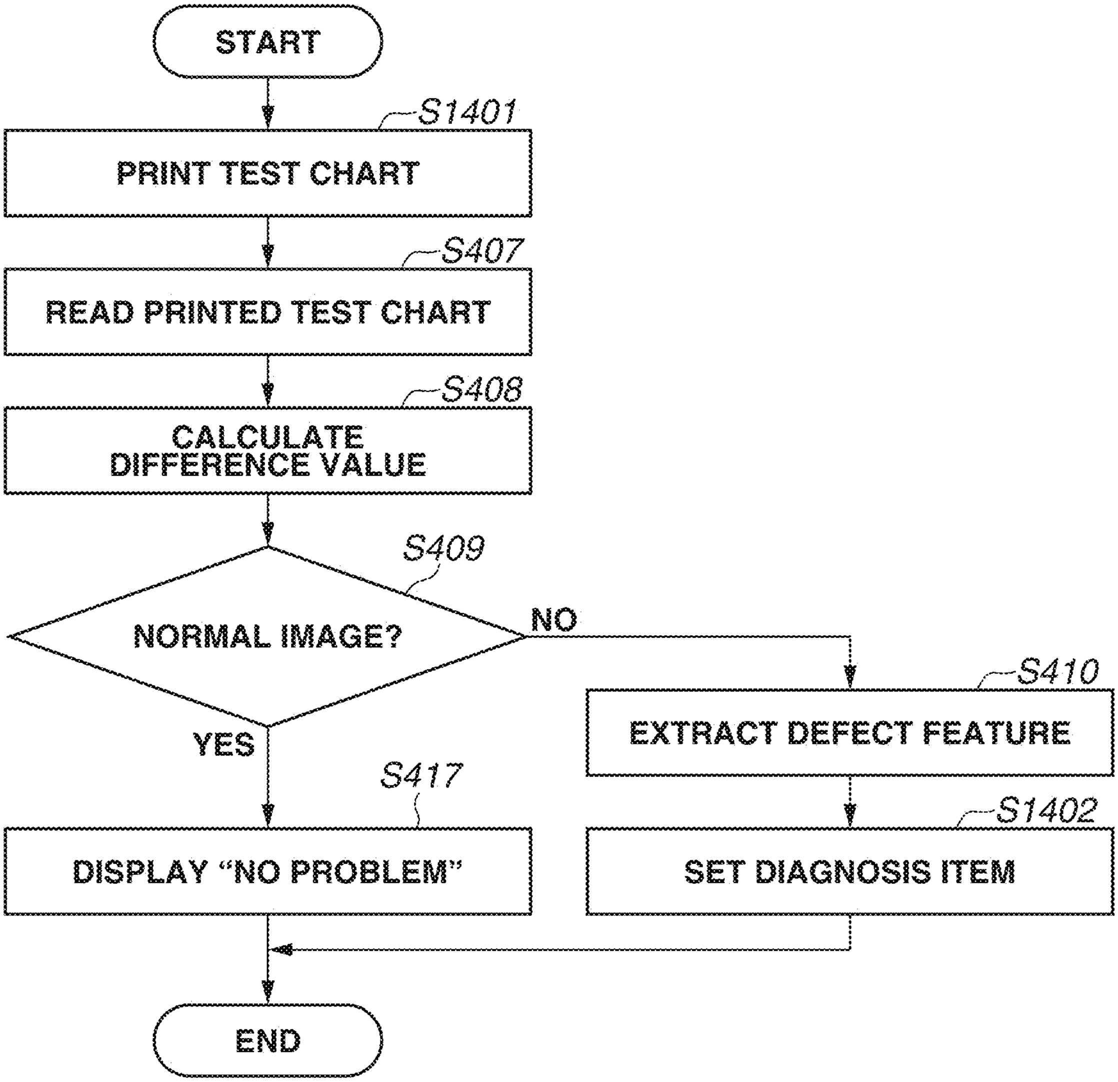
FIG. 14 is a flowchart illustrating a procedure of simple image diagnosis processing according to a second embodiment.

FIG. 14 is a flowchart illustrating a printing operation performed by the printing unit 107 and a procedure of simple image diagnosis processing performed by the diagnosis unit 108. The processing in each step in FIG. 14 is executed by the CPU 206 of the printing unit 107 and the CPU 214 of the diagnosis unit 108.

In step S1401, the printing system 100 receives an instruction for an image diagnosis from a user or a service person via the UI display unit 241 also serving as the operation unit. Then, the CPU 251 of the external controller 102 reads a test chart stored in advance, rasterizes the read test chart into a bitmap, and generates a rasterized bitmap of the test chart as a reference image. The test chart is an image for diagnosing a malfunction of the image forming apparatus 101 (hereinbelow, also referred to as a test image). FIG. 10 is a diagram illustrating a test chart used for the image diagnosis processing according to the present embodiment. The image portion 1001 illustrates an area in which an image is formed with color materials. For example, the image portion 1001 is a single color image having the image area ratio of 50%, and the total of four types of test charts are printed using each one of cyan (C), magenta (M), yellow (Y), and black (K). The CPU 251 transmits the rasterized bitmap data of the test charts to the video I/F 205 of the printing unit 107 from the video I/F 258 via the video cable 106. The CPU 206 of the printing unit 107 performs halftone processing on the bitmap data of the test charts received by the video I/F 205, and prints the test charts based on the halftone processed image data in the print unit 203. In addition, the configuration of the test chart is merely an example, and is not limited to the above-described example. On condition that a defect or malfunction of the printing unit 107 become apparent or revealed using a difference image (described below), the ratio between the image portion 1001 and a non-image portion, and the area ratio may be different, and the image portion 1001 may be formed using two or more color materials. In addition, a plurality of image portions different in color material may be formed on one sheet.

In step S1402, the CPU 214 determines a diagnosis item and a diagnosis color for which an image diagnosis is required, based on the feature information of the difference area obtained in step S410. The CPU 214 determines the diagnosis item and the diagnosis color for which the image diagnosis is required, based on the color material information indicating in which color of yellow, magenta, cyan, and black extracted in step S410 the defect has occurred, and the shape information, such as a dot shape, a vertical streak shape, and a horizontal streak shape. For example, in a case where a yellow vertical streak is extracted, the diagnosis item "vertical streak" and the diagnosis color "Y" are ON, and the CPU 214 starts the image diagnosis processing. In a case where a yellow vertical streak and a magenta vertical streak are extracted, the diagnosis item "vertical streak", and the diagnosis colors "Y" and "M" are turned ON, and the image diagnosis processing is started. Further, in a case where a yellow vertical streak and a magenta dot are extracted, the diagnosis item "vertical streak" and the diagnosis color "Y", and the diagnosis item "dot" and the diagnosis color "M" are turned ON, and the image diagnosis processing is started.

Then, the CPU 214 performs the image diagnosis processing described with reference to FIG. 4 in the first embodiment. Thereafter, the CPU 251 performs the calculation of the number of test charts required for the image diagnosis in step S403 based on the diagnosis items and the diagnosis colors determined in step S1402, and then performs the notification of the number of test charts in step S404. In this way, even in the configuration in which the diagnosis items and diagnosis colors are automatically determined by performing the simple image diagnosis, it is possible to notify the user of the number of sheets to be used for the image diagnosis and reduce consumption of sheets that is not intended by the user.

OTHER EMBODIMENTS

The present invention can be realized by processing of supplying a program for implementing one or more functions of the above-described embodiments to a system or an apparatus via a network or a storage medium, and causing one or more processors in the system or the apparatus to read and execute the program. Further, the present invention can also be realized by a circuit (e.g., application specific integrated circuits (ASIC)) that can implement one or more functions.

According to the present invention, it is possible to confirm the number of sheets with diagnosis images thereon to be output, before the diagnosis is performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims. Each of the embodiments of the invention described above can be implemented solely or as a combination of a plurality of the embodiments. Also, features from different embodiments can be combined where necessary or where the combination of elements or features from individual embodiments in a single embodiment is beneficial.

This application claims the benefit of Japanese Patent Application No. 2023-101672, filed Jun. 21, 2023, which is hereby incorporated by reference herein in its entirety.

What is claimed is:

1. An image diagnosis system comprising:

at least one memory and at least one processor, which causes the image diagnosis system to function as:

an operation unit configured to display information;

an image forming unit including a plurality of portions and configured to form an image on a sheet;

a reading unit configured to read the image formed by the image forming unit;

a display control unit configured to cause the operation unit to display a screen for receiving an instruction to start an image diagnosis; and a diagnosis unit configured to, upon the operation unit receiving the instruction to start the image diagnosis, cause the image forming unit to form a diagnosis image on the sheet, to cause the reading unit to read the diagnosis image formed and output by the image forming unit, and to diagnose a malfunction portion of the image forming unit based on the read image, wherein the display control unit causes the operation unit to, before receiving the instruction to start the image diagnosis, display a screen including a display of a number of output sheets on which the diagnosis image is to be formed in response to receiving the instruction to start the image diagnosis, and wherein the operation unit receives the instruction to start the image diagnosis on the screen including the display of the number of output sheets.

2. The image diagnosis system according to claim 1, wherein the number of output sheets is determined based on a diagnosis item for the image diagnosis.

3. The image diagnosis system according to claim 1, wherein the number of output sheets is determined based on a model type for which the image diagnosis is performed.

4. The image diagnosis system according to claim 1, wherein the number of output sheets is determined based on a size of a sheet on which the diagnosis image is formed.

5. The image diagnosis system according to claim 1, further comprising a recovery unit configured to cause the image forming unit to form and output a recovery image on a sheet, cause the reading unit to read the recovery image formed and output by the image forming unit, and recover the malfunction portion identified through a diagnosis by the diagnosis unit based on the read image, wherein the screen includes a display of a number of output sheets with the recovery image thereon.

6. The image diagnosis system according to claim 5, wherein, in a case where the malfunction portion of the image forming unit is identified as a result of the diagnosis by the diagnosis unit, the recovery unit recovers the malfunction portion of the image forming unit.

7. The image diagnosis system according to claim 1, wherein a diagnosis item diagnosed by the diagnosis unit is one or more of a vertical streak, a horizontal streak, and a dot.

8. An image diagnosis method comprising:

controlling an operation unit to display a screen for receiving an instruction to start an image diagnosis; and causing, if the operation unit receives the instruction to start the image diagnosis, an image forming unit to form a diagnosis image on a sheet, causing a reading unit to read the diagnosis image formed and output by the image forming unit, and diagnosing a malfunction portion of the image forming unit based on the read image, wherein the display control unit causes the operation unit to, before receiving the instruction to start the image diagnosis, display a screen including a display of a number of output sheets on which the diagnosis image is to be formed in response to receiving the instruction to start the image diagnosis, and wherein the operation unit receives the instruction to start the image diagnosis on the screen including the display of the number of output sheets.

9. The image diagnosis method according to claim 8, wherein the number of output sheets is determined based on a diagnosis item for the image diagnosis.

10. The image diagnosis method according to claim 8, wherein the number of output sheets is determined based on a model type for which the image diagnosis is performed.

11. The image diagnosis method according to claim 8, wherein the number of output sheets is determined based on a size of a sheet on which the diagnosis image is formed.

12. The image diagnosis method according to claim 8, further comprising:

causing the image forming unit to form a recovery image;

causing the reading unit to read the recovery image formed and output by the image forming unit; and recovering the malfunction portion identified through a diagnosis in the diagnosing based on the read image, wherein the screen includes a display of a number of output sheets with the recovery image thereon.

13. The image diagnosis method according to claim 12, wherein, in a case where the malfunction portion of the image forming unit is identified as a result of the diagnosis in the diagnosing, a recovery in the recovering is performed.

14. The image diagnosis method according to claim 8, wherein a diagnosis item diagnosed in the diagnosing is one or more of a vertical streak, a horizontal streak, and a dot.

* * * * *